United States Patent [19]
Dharmadhikary et al.

[11] Patent Number: 6,150,020
[45] Date of Patent: Nov. 21, 2000

[54] ARTICLES EXHIBITING IMPROVED HYDROPHOBICITY

[75] Inventors: Rahul K. Dharmadhikary, Taunton; W. Andrew Coslett, Medfield, both of Mass.; Eric S. Gardiner, Westtown, N.Y.

[73] Assignee: BBA Nonwovens Simpsonville, Inc., Simpsonville, S.C.

[21] Appl. No.: 09/162,666

[22] Filed: Sep. 29, 1998

Related U.S. Application Data

[63] Continuation-in-part of application No. 08/867,598, Jun. 2, 1997, abandoned, which is a continuation-in-part of application No. 08/651,358, May 22, 1996, Pat. No. 5,635,128, which is a division of application No. 08/519,990, Aug. 28, 1995, Pat. No. 5,567,531, which is a division of application No. 08/126,382, Sep. 23, 1993, Pat. No. 5,473,002.

[51] Int. Cl.$^7$ ..................................................... B32B 27/39
[52] U.S. Cl. ........................... 428/394; 428/395; 524/188; 524/262; 524/263; 524/265; 524/267; 524/269; 264/328.1
[58] Field of Search ..................................... 428/288, 394, 428/395; 524/188, 262, 263, 265, 267, 269; 264/328.1

[56] References Cited

U.S. PATENT DOCUMENTS

| | | |
|---|---|---|
| 3,989,788 | 11/1976 | Estes, Jr. et al. . |
| 4,162,190 | 7/1979 | Ashworth . |
| 4,582,750 | 4/1986 | Lou et al. . |
| 5,145,727 | 9/1992 | Potts et al. . |
| 5,366,786 | 11/1994 | Connor et al. . |
| 5,473,002 | 12/1995 | Gardiner et al. . |
| 5,476,458 | 12/1995 | Glaug et al. . |
| 5,494,855 | 2/1996 | Nohr et al. . |
| 5,534,340 | 7/1996 | Gupta et al. . |
| 5,540,953 | 7/1996 | Harrington . |
| 5,567,531 | 10/1996 | Gardiner et al. . |
| 5,589,258 | 12/1996 | Maddern et al. . |

*Primary Examiner*—Peter D. Mulcahy
*Attorney, Agent, or Firm*—Alston & Bird LLP

[57] ABSTRACT

The specification discloses polymeric articles such as fibers and fibrous webs which exhibit improved hydrophobicity and methods for making the articles. The articles comprise a polymer selected from the group consisting of polyolefins and polyesters and an additive of the structure $R^1$—A—Si$(R^2R^3)$—O—(Si$(R^4R^5)$—O)n—Si—$(R^6R^7)$—A—$R^8$, wherein $R^1$ and $R^8$ are selected from the group consisting of alkyl, aryl, alkylaryl groups and acyl and arylacyl derivatives of an aliphatic or aliphatic/aromatic mono-acid with a molecular weight of from about 250 to about 600 daltons, A is selected from the group consisting of —O—, —NH—C(O)—NH—$(CH_2)_3$—, and —C(O)—NH—$(CH_2)_3$—, $R^2$, $R^3$, $R^6$ and $R^7$ are selected from the group consisting of $CH_3$, $C_2H_5$, $C_3H_7$, and $C_4H_9$, $R^4$ and $R^5$ are selected from the group consisting of $CH_3$, $C_2H_5$, $C_3H_7$, and $(CH_2)_I$—$C_jF_{2j+1}$, wherein I is from 0 to 3 and j is an integer from I to 3, and n is an integer from 7 to 70.

36 Claims, No Drawings

ARTICLES EXHIBITING IMPROVED HYDROPHOBICITY

RELATED U.S. APPLICATIONS

This application is a continuation of application Ser. No. 08/867,598, filed Jun. 2, 1997, now abandoned, which is a continuation-in-part of application Ser. No. 08/651,358, filed May 22, 1996, now U.S. Pat. No. 5,635,128 issued Jun. 3, 1997, which is a division of application Ser. No. 08/519,990, filed Aug. 28, 1995, now U.S. Pat. No. 5,567,531, issued Oct. 22, 1996, which is a division of application Ser. No. 08/126,382, filed Sep. 23, 1993, now U.S. Pat. No. 5,473,002, issued Dec. 5, 1995.

FIELD OF THE INVENTION

The present invention relates to hydrophobic articles such as synthetic fibers and to methods for making articles which exhibit improved hydrophobicity.

BACKGROUND OF THE INVENTION

A variety of woven and nonwoven webs including spunbond (SB) and spunbond-meltblown-spunbond (SMS) fabrics are made using hydrophobic synthetic fibers. The webs are used for a wide variety of applications including diaper back sheets, cuff materials, surgical drapes, surgical gowns, nonwoven food service apparel and other applications in which barrier properties such as moisture permeability, liquid retention, air permeability and vapor permeability are important. Common materials for the fibers used to make such webs are polymers such as polypropylene and polyethylene. While these polymers are hydrophobic to a degree, the barrier properties of webs made from the fibers are insufficient for some applications. Accordingly, it has been necessary to apply surface finishes to the webs to improve their barrier properties for certain end uses.

Surface finishes applied to hydrophobic fibers and webs are not very durable and tend to erode or rub off the material during use. This is of particular concern to the medical field where hydrophobic webs find use as fabrics, sheets and various other articles to block transmission of body fluids and other substances between the medical personnel and the patient and vice-versa.

Another problem associated with coated fabrics is that the fabrics tend to exhibit rough surface feel characteristics. Fabrics having softer surface feel properties tend to be less durable. In applications which require a clean environment, abrasion of the less durable fabric garments may cause fibers in the outer layers of such fabrics to break away from the bulk of the fabric and form fiber pills which may detach from the surface and contaminate the environment. In applications requiring protection of the wearer from large amounts of dusts or fibers, the rough surface of the fabric garment can entrap the dusts or fibers and upon removal of the garment, the trapped dusts or fibers may enter the breathing zone of the wearer.

It is therefore an object of the invention to provide synthetic fibers which exhibit hydrophobic characteristics.

Another object of the invention is to provide webs containing synthetic fibers which exhibit hydrophobic characteristics.

A further object of the invention is to provide a method for decreasing the surface energy of hydrophobic fibers.

An additional object of the invention is to provide a fibrous web with enhanced barrier properties.

Still another object of the invention is to provide a fibrous web containing hydrophobic fibers which exhibit decreased surface energy.

Yet another object of the invention is to provide hydrophobic fibers for a web which give the web substantially permanent barrier properties which are not subject to removal by wear, abrasion or laundering.

Another object of the invention is to provide hydrophobic fibers for use in making fibrous webs with reduced air permeability, increased strength and increased softness.

With regard to the above and other objects, and in accordance with its more general aspects, the invention provides an article which comprises a mixture of polymer selected from the group consisting of polyolefins and polyesters and an additive having the structure $R^1$—A—Si$(R^2R^3)$—O—$(Si(R^4R^5)$—O$)_n$—Si$(R^6R^7)$—A—$R^8$ wherein the $R^1$ and $R^8$ units are selected from the group consisting of alkyl, aryl, alkylaryl groups and acyl and arylacyl derivatives of an aliphatic or aliphatic/aromatic mono-acid with a molecular weight of from about 250 to about 600 daltons, A is selected from the group consisting of —O—, —NH—C(O)—NH—$(CH_2)_3$—, and —C(O)—NH—$(CH_2)_3$—, $R^2$, $R^3$, $R^6$ and $R^7$ are selected from the group consisting of $CH_3$, $C_2H_5$, $C_3H_7$, and $C_4H_9$, $R^4$ and $R^5$ are selected from the group consisting of $CH_3$, $C_2H_5$, $C_3H_7$, and $(CH_2)_I$—$C_jF_{2j+1}$, wherein I is from 0 to 3 and j is an integer from 1 to 3, and n is an integer from 7 to 70. In one embodiment, the article is a fiber which can be incorporated into a web or sheet such as a nonwoven or woven fabric.

In accordance with another aspect of the invention, a method is provided for making a shaped polymeric article such as a fiber which comprises mixing a polymer selected from the group consisting of polyolefins and polyesters with an additive having the structure $R^1$—A—Si$(R^2R^3)$—O—$(Si(R^4R^5)$—O$)_n$—Si$(R^6R^7)$—A—$R^8$ wherein $R^1$ and $R^8$ are selected from the group consisting of alkyl, aryl, alkylaryl groups and acyl and arylacyl derivatives of an aliphatic or aliphatic/aromatic mono-acid with a molecular weight of from about 250 to about 600 daltons, A is selected from the group consisting of —O—, —NH—C(O)—NH—$(CH_2)_3$—, and —C(O)—NH—$(CH_2)_3$—, $R^2$, $R^3$, $R^6$ and $R^7$ are selected from the group consisting of $CH_3$, $C_2H_5$, $C_3H_7$, and $C_4H_9$, $R^4$ and $R^5$ are selected from the group consisting of $CH_3$, $C_2H_5$, $C_3H_7$, and $(CH_2)_I$—$C_jF_{2j+1}$, wherein I is from 0 to 3 and j is an integer from 1 to 3, and n is an integer from 7 to 70, and molding the mixture into the shaped polymeric article. The molding step may be an extrusion or casting step such as in the manufacture of fibers.

Articles according to the invention such as fibers exhibit substantially enhanced hydrophobicity. Accordingly, a web made from fibers incorporating the compositions of the invention, in whole or in part, is expected to exhibit improved barrier properties. Webs including fabrics containing the fibers can exhibit barrier properties which are comparable to conventional fabrics at a much lower weight. Hence, the denier of fibers used to make the fabric may be reduced resulting in savings in fabric cost. Fabrics containing the fibers are also expected to exhibit improved durability as compared with conventional barrier fabrics, have increased opacity, reduced air permeability and a softer texture.

The invention is especially well adapted for use in making fibers based on hydrophobic polymers selected from the group consisting of polyolefins such as polypropylene (PP), polyethylene (PE), polybutylene (PB), polystyrene (PS), and mixtures thereof and polyesters such as polybutylene terephthalate (PBT), polyethylene terephthalate (PET) and mixtures thereof. The invention is particularly advantageous for polyolefin-based fibers, most preferably PE or PP.

The polymer comprises a major portion of the composition which may include conventional additives such as flame retardants, pigments, fillers, antioxidants, UV stabilizers and the like. Accordingly, the composition may contain from about 90 to about 99.9% by weight of the polymer with the conventional additives being used in amounts sufficient to confer the desired properties.

The additive mixed with the polymer has the structure $R^1$—A—Si($R^2R^3$)—O—(Si($R^4R^5$)—O)$_n$—Si($R^6R^7$)—A—$R^8$ wherein the $R^1$ and $R^8$ units are selected from the group consisting of alkyl, aryl, alkylaryl groups and acyl and arylacyl derivatives of an aliphatic or aliphatic/aromatic mono-acid with a molecular weight of from about 250 to about 600 daltons, A is selected from the group consisting of —O—, —NH—C(O)—NH—(CH$_2$)$_3$—, and —C(O)—NH—(CH$_2$)$_3$—, $R^2$, $R^3$, $R^6$ and $R^7$ are selected from the group consisting of CH$_3$, C$_2$H$_5$, C$_3$H$_7$, and C$_4$H$_9$, $R^4$ and $R^5$ are selected from the group consisting of CH$_3$, C$_2$H$_5$, C$_3$H$_7$, and (CH$_2$)$_I$—C$_j$F$_{2j+1}$, wherein I is from 0 to 3 and j is an integer from 1 to 3, and n is an integer from 7 to 70.

When the polymer to which the additive is added is PP, it is preferred that $R^1$ and $R^8$ be hydrogenated abietic acid, A is —O—, $R^2$, $R^3$, $R^4$, $R^5$, $R^6$, and $R^7$ be CH$_3$, and n be an integer from 15 to 70. For use with polyethylene, it is preferred that the $R^1$ and $R^8$ units be selected from the group consisting of derivatives of dehydroabietic acid, dihydroabietic acid, abietic acid, tetrahydroabietic acid, pimaric acid and palustric acid, wherein A is —C(O)—NH—(CH$_2$)$_3$—, wherein $R^2$, $R^3$, $R^4$, $R^5$, $R^6$, and $R^7$ are CH$_3$, and wherein n is an integer from 20 to 60.

When the polymer is PS, it is preferred that $R^1$ and $R^8$ be derivatives of abietyl, A be —O—, $R^2$—$R^7$ be CH$_3$, and n be from 15 to 70. When the polymer is PET, the preference is that $R^1$ and $R^8$ be derivatives of abietyl, A be —O—, $R^2$—$R^7$ be CH$_3$, and n be from 15 to 70.

The additive is intimately mixed with the polymer to obtain a substantially homogeneous mixture of polymer and additive. Mixing may be accomplished by any of the methods known or hereafter known in the art for mixing additives with polymers. For example, the additive and polymer may be melt-blended together or they may individually be dissolved in one or more compatible (i.e., miscible) solvents, the solvent solutions mixed together and the solvents removed by evaporation, extraction, distillation and the like, producing a polymeric composition containing the additive. Suitable solvents for polypropylene and the additive include, but are not limited to, orthodichlorobenzene and trichlorobenzene.

The additive may be mixed with the polymer in an amount ranging from about 0.05 to about 5% by weight or more. For most applications an effective amount of additive will range from about 0.05 to about 3.0% by weight, and from about 0.1 to about 0.5% additive by weight of the total composition will generally be sufficient to materially improve the hydrophobicity of the composition. The additive may be supplied all at once to the polymer or a concentrate containing polymer and additive may be formed and the concentrate added to additional polymer. For example, the additive may be mixed with the polymer to provide a concentrate containing about 2% by weight additive and the concentrate may then be melt-blended with additional polymer to provide a composition containing from about 0.1 to about 0.5% by weight additive.

In a preferred embodiment, the composition is prepared by feeding the polymer in solid particulate or pellet form to an extruder hopper and adding the additive to the polymer in the extruder. Since the additive is typically in liquid form and the polymer is typically a solid at room temperature, the additive may be fed into the extruder at a variety of locations. It is preferred, though not required, to first melt the polymer before mixing the additive with the molten polymer. For example, solid polymer particles may be fed by means of a hopper into an extruder where it is advanced through a melting stage and the additive is injected into the molten polymer at a point in the extruder which can provide substantial and intimate blending of the additive and polymer. Alternatively, the polymer and additive may be mixed with one another in a thermostatted vessel wherein the components are maintained in liquid form during mixing.

The mixture of polymer, additive and other additives may be conducted directly to a mold or extruder in liquid form or after a homogeneous mixture of the two components is obtained, the composition may be cooled, solidified and granulated or chopped before feeding solid particles containing the composition to an extruder or molding apparatus to form articles or fibers containing the composition. For example, the composition in molten form containing the polymer and additive may be fed through an orifice of an extruder to produce an elongate rod which is then cooled and chopped or cut into pellets. The pellets may then be used in a molding machine to produce a shaped article or submitted to an extruder containing a spinnette to produce fibers or filaments.

A fiber producing extruder typically contains spinning orifices in a spinnerette which form unitary filaments having a substantially uniform cross sectional diameter along substantially the entire length of the filaments. The filaments produced by such an extruder may be drawn and texturized and then wound on a spindle or roll, and then used to weave a fabric or a nonwoven fabric using a melt-blown or a spunbond process.

In a typical spunbond process, a polymeric composition which may contain one or more polymeric materials, processing aids, plasticizers and the like is fed to a hopper, then to an extruder and metering pump and to a spin box wherein filaments are spun through a moving spinnerette onto a continuous foraminous surface such as a belt, plate or screen. The spinnerette contains openings arranged in one or more rows to form a curtain of filaments which is directed to a quench chamber. In the quench chamber the filaments are contacted with air or other cooling fluid under a low pressure. As the filament curtain is quenched it is directed through a narrow chamber at the lower end of the quench chamber whereby the cooling fluid attains a high velocity. After exiting the quench chamber, the filaments are collected on the moving foraminous surface such as an endless screen or belt to form a non-woven web.

During the spinning operation, the spinnerette is moving across the collecting surface so that the filaments extruded from the spinnerette are laid down in random orientation on the collecting surface. As the filaments are deposited, they cool and solidify into a fibrous web. Because the filaments are still in a softened form when they are extruded from the spinnerette, the fibers tend to bond to one another at their overlaps and intersections. Additional bonding may be achieved by use of binders or by heating and pressing the fibrous web using an embossed, heated nip roll in order to melt the fibers together and to modify the texture of the web.

Methods for making spunbond fabrics are described in U.S. Pat. No. 3,692,618 to Dorschner et al, U.S. Pat. Nos. 3,338,992 and 3,341,394 to Kinney, U.S. Pat. No. 3,989,788 to Estes, Jr. et al. and U.S. Pat. No. 4,340,563 to Appel et al., incorporated herein by reference as if fully set forth.

In a melt-blown process, a polymeric composition is fed to a hopper, then to an extruder and metering pump to a spin box. The spin box contains a spinnerette and a source of high pressure fluid such as air to surround and entrain the polymeric material and to educt the filaments from the orifices of the spinnerette. As the filaments are educted, they are deposited on a moving foraminous surface such as a belt or screen. The high pressure fluid spreads the polymeric stream and forms microfibers which are randomly deposited on the moving web to form a melt-blown layer of fibers. Methods for making melt-blown webs are known in the art and are described in U.S. Pat. No. 3,849,241 to Buntin et al., incorporated herein by reference as if fully set forth.

While not desiring to be bound by theory, it is believed that the additive lowers the surface energy of the polymeric composition upon solidification thereof because at least a portion of the additive has migrated to or near the exposed surface the article containing the composition thereby changing its surface characteristics. It is also believed that the surface of the article material exhibits a decreased surface energy due to the presence of a siloxane midblock of the additive at the surface of the article. Because the additive is intimately mixed with the polymer rather than being applied as a surface treatment on the article, the effect of the additive is not significantly diminished by wear or abrasion.

Furthermore, the additive is substantially non-fugitive from the composition and, consequently, the surface energy of an article containing the composition is substantially permanently lowered. The substantial non-fugitive nature of the composition is due, at least in part, to the presence of the hydrocarbon end blocks of the additive. The hydrocarbon end blocks provide anchors in the polymer for the midblock which exists near or at the surface of the article due to migration of the additive to the surface of the article during the cooling step.

The decrease in surface energy of the composition enables a variety of beneficial uses for the material. For example, the material may be formed into films, fibers, molded articles and the like.

With the decrease in surface energy, there is often also a reduction in the coefficient of friction for shaped articles containing the composition of the invention. Therefore, articles according to the invention may be useful as bearings and in other non-stick applications where surface-to-surface movement with a minimum of friction is required.

The additive itself is also useful as a film extrusion processing aid, lubricant or anti-blocking agent. Accordingly, when the additive is introduced into and is intimately mixed with the polymer, extrusion of the composition is accomplished with lower energy input and greater ease.

The following nonlimiting examples illustrate certain other aspects of the invention and its various embodiments.

EXAMPLE 1
Synthesis of Abietyl Additive:

An α,ω-dichloro polydimethyl siloxane (PDMS) oligomer with a molecular weight of between 3500 and 4000 daltons was etherified with two equivalents of abietyl alcohol in pyridine solution at 116±1° C. for 54 hours. The solution was filtered to remove by-product pyridinium hydrochloride. The solution was then diluted with toluene and washed four times with water. The solvent was removed by distillation. The resulting additive had the structure:

abietyl—$CH_2$—O—$Si(CH_3)_2$—O—$[Si(CH_3)_2$—O—$]_n$—$Si(CH_3)_2$—O—$CH_2$-abietyl

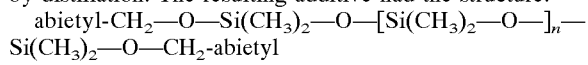

wherein n is 54 and the number average molecular weight of the additive was about 4000–4500.

EXAMPLE 2
Synthesis of Diamino PDMS Teleomer:

A series of α,ω-diamino PDMS teleomers with number average molecular weights of between 2,000 and 20,000 daltons were synthesized by anionic copolymerization of bis-(3-aminopropyl) tetramethyldisiloxane with octamethylcyclotetrasiloxane according to well known synthesis techniques. The reaction was run neat and initiated with either potassium siloxane or tetramethylammonium siloxanoate as a catalyst. The resulting teleomer was used for making additional additives.

EXAMPLE 3
Synthesis of Rosin Additive:

Rosin amine (made with rosin containing 64% by weight dehydroabietyl groups) was converted to rosin isocyanate by reaction of the amine with triphosgene. Two equivalents of the rosin isocyanate were reacted with one equivalent of the teleomer of Example 2. The reaction was run with toluene as a solvent and proceeded at 30° C. for one hour followed by reaction at 70° C. for one hour. The solvent was removed by distillation. The resulting additive had the structure:

dehydroabietyl—NH—C(O)—NH—$(CH_2)_3$—$Si(CH_3)_2$—O—$[Si(CH_3)_2$—O—$]_n$—$Si(CH_3)_2$—$(CH_2)_3$—NH—C(O)—NH—dehydroabietyl wherein n was 28 to 57.

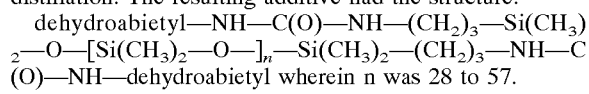

EXAMPLE 4
Alternative Synthesis of Rosin Additive:

Three equivalents of rosin acid from tall oil rosin were reacted with one equivalent of the teleomer of Example 2. The reaction employed xylene as a solvent. The reaction was conducted at 142° C. for 6 hours with azeotropic removal of evolved water. The solvent was removed by distillation and excess rosin was removed by vacuum distillation. The resulting additive had the structure:

rosin-C(O)—NH—$(CH_2)_3$—$Si(CH_3)_2$—O—$[Si(CH_3)_2$—O—$]_n$—$Si(CH_3)_2$—$(CH_2)_3$—NH—C(O)-rosin wherein n was 28 to 57.

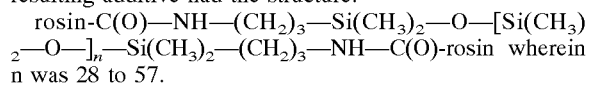

EXAMPLE 5
Alternative Synthesis of Rosin Additive:

Two equivalents of rosin acid from tall oil rosin were reacted with one equivalent of the teleomer of Example 2 in refluxing methylene chloride as a solvent in the presence of a strong condensation aid (such as dicyclohexyl carbodiimide). The reaction solution was filtered to remove by-product urea and the solvent was removed by distillation. The resulting additive had the structure:

rosin-C(O)—NH—$(CH_2)_3$—$Si(CH_3)_2$—O—$[Si(CH_3)_2$—O—$]_n$—$Si(CH_3)_2$—$(CH_2)_3$—NH—C(O)-rosin wherein n was 28 to 57.

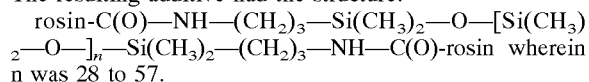

EXAMPLE 6

To prepare concentrates, the additive of Example 1 was compounded in an amount of about 2% by weight with polypropylene having a melt flow rate of 800 (grams/10 min.) commercially available under the tradename HH 442 from Montell Polyolefins of Wilmington, Del. The compounding was conducted in a twin-screw, counter-rotating extruder having 34 millimeter screws at 150 to 200 rpm while maintaining a constant temperature of 50° C. in order to obtain a composition having a uniform viscosity below 1000 centipoise. Additional compositions were made using the additive of Example 1 at concentrations of 1.5 to 2.0% by weight compounded with HH 442 polypropylene for making a melt-blown sample and with PP 3445 polypropylene having a melt flow rate of 35 (grams/10 min.) commercially available from Exxon Chemical Company of Baytown, Tex. to make a spunbond sample. The concentrates were added with additional pure polypropylene to the melt-blow or spunbond lines at a rate of 4–5 to 1 pure polypropylene to the concentrate to obtain a fabric having the desired additive content.

Melt-blown polypropylene fabric webs were made using a 1 meter and a 20 inch meltblown line available from J&M Laboratories of Dawsonville, Ga. The operating conditions for making the fabric were initially optimized for pure polypropylene resin. Once the conditions were optimized for pure polypropylene, compounded resin containing the additive of Example 1 was used to make the fabrics. The 20 inch machine had a die temperature of 460° F. (238° C.), an air volume of 380 cubic feet per minute for 4 grams per square meter (gsm) weight of fabric at a line speed of 150 meters per minute, an air temperature of 430° F. (221° C.) and a die to collector distance of 6 inches. The 1 meter machine had a die temperature of 530° F. (277° C.), an air volume of 585 cubic feet per minute for 4 gsm weight fabric and 750 cubic feet per minute for 6 and 10 gsm weight fabric, an air temperature of 521° F. (272° C.) and a die to collector distance of 8 inches. The line speed for the 6 gsm fabric was 150 meters per minute and for 10 gsm fabric was 100 meters per minute. The fabrics made with resin containing the additive were made under the same operating conditions as the fabric made without the additive.

The properties of the fabrics made without the additive using the 1 meter meltblown line are contained in Table 2 and fabrics made with the 0.25% by weight additive using the 1 meter meltblown line are contained in Table 3.

TABLE 2

Control Samples

|  | Sample 1 (0.5 g/h/min) | Sample 2 (0.75 g/h/min) | Sample 3 (0.75 g/h/min) |
| --- | --- | --- | --- |
| Web weight (grams/m$^2$) | 4.1 | 5.9 | 8.3 |
| Machine Direction (MD) stress (g/inch) | 118.3 | 185.7 | 345.6 |
| Machine Direction (MD) elongation (%) | 14.3 | 7.4 | 8.6 |
| Air Permeability (cfm) | 456.8 | 277.8 | 174.0 |
| Hydrostatic head (mm of H$_2$O) | 85.8 | 167.6 | 356.9 |
| Mean pore size (microns) | 25.5 | 31.4 | 21.7 |

TABLE 3

Samples with Additive at 0.25% by weight

|  | Sample 4 (0.5 g/h/min) | Sample 5 (0.75 g/h/min) | Sample 6 (0.75 g/h/min) |
| --- | --- | --- | --- |
| Web weight (grams/m$^2$) | 4.1 | 6.1 | 8.3 |
| MD tensile stress (g/inch) | 108.0 | 194.6 | 260.7 |
| MD elongation (%) | 13.1 | 8.0 | 7.1 |
| Air Permeability (cfm) | 330.0 | 162.0 | 120.5 |

TABLE 3-continued

Samples with Additive at 0.25% by weight

|  | Sample 4 (0.5 g/h/min) | Sample 5 (0.75 g/h/min) | Sample 6 (0.75 g/h/min) |
| --- | --- | --- | --- |
| Hydrostatic head (mm of H$_2$O) | 126.7 | 197.0 | 443.1 |
| Mean pore size (microns) | 18.6 | 16.3 | 16.2 |

The fibers of fabrics made with the additive of Example 1 exhibited a significant decrease in mean pore size, maximum pore size and a reduction of 25 to 35% in fiber diameter compared to the fibers of fabric made without the additive.

As shown in the foregoing tables, fabric made with the additive exhibited a 30 to 40% decrease in air permeability over the same fabric made without the additive and there was about a 50% increase in hydrostatic head of the fabric made with the additive at 0.5 g/h/min and a 20 to 25% increase in hydrostatic head of fabric made with the additive at 0.75 g/h/min as compared to the same fabric made without the additive.

Additional web samples were run on the 20 inch meltblown line using 0, 0.25 and 0.4% by weight of the additive of Example 1 by diluting the concentrate containing the additive with polypropylene. The physical properties of webs made with and without the additive are shown in the following table.

TABLE 4

|  | Sample 7 (0% additive) | Sample 8 (0.25 wt. % additive) | Sample 9 (0.4 wt. % additive) |
| --- | --- | --- | --- |
| Web weight (grams/m$^2$) | 8.7 | 8.8 | 8.7 |
| Web Thickness (mils) | 7.3 | 6.6 | 5.9 |
| MD Stress (g/inch) | 340.8 | 371.1 | 416.7 |
| MD Strain (%) | 41.4 | 47.6 | 50.5 |
| Cross-machine Direction (CD) Stress (g/inch) | 230.4 | 247.1 | 241.2 |
| Cross-machine Direction (CD) Strain (%) | 78 | 91.6 | 81.4 |
| Air Permeability (cfm) | 419.8 | 297.8 | 229 |
| Hydrostatic head (mm of H$_2$O) | 170.6 | 242.9 | 293.6 |
| Fiber Diameter (microns) | 5 | 3.5 | 3.3 |
| Water Contact Angle (°) | 132 | 136 | 158 |

As shown by the foregoing data, a polypropylene fabric containing an additive according to the invention exhibits significantly greater strength in both the machine direction (MD) and cross machine direction (CD). The fabric is much less porous than the polypropylene web made without the additive as evidenced by the air permeability of the web. Webs containing fibers made with the additive also have substantially better barrier properties as evidenced by the increased hydrostatic head of samples 8 and 9 compared to the control sample. These results are surprising and quite unexpected in view of the very small amount of additive used in the fibers.

Although the specification discloses various embodiments and features of the invention, the specification is only for the purpose of illustration and is not intended to limit the scope of the invention. Those skilled in the art may recognize or develop numerous rearrangements, modifications and substitutions of parts of the embodiments disclosed herein without departing from the scope and spirit of the invention as set forth in the appended claims.

What is claimed is:

1. A nonwoven web containing synthetic fibers which comprise a polymer selected from the group consisting of polyolefins and polyesters and an additive having the structure $R^1$—A—$Si(R^2R^3)$—O—$(Si(R^4R^5)$—O$)_n$—$Si(R^6R^7)$—A—$R^8$ wherein the $R^1$ and $R^8$ units are selected from the group consisting of alkyl, aryl, alkylaryl groups and acyl and arylacyl derivatives of an aliphatic or aliphatic/aromatic mono-acid with a molecular weight of from about 250 to about 600 daltons, A is selected from the group consisting of —O—, —NH—C(O)—NH—$(CH_2)_3$—, and —C(O)—NH—$(CH_2)_3$—, $R^2$, $R^3$, $R^6$ and $R^7$ are selected from the group consisting of $CH_3$, $C_2H_5$, $C_3H_7$, and $C_4H_9$, $R^4$ and $R^5$ are selected from the group consisting of $CH_3$, $C_2H_5$, $C_3H_7$, and $(CH_2)_I$—$C_jF_{2j+1}$, wherein I is from 0 to 3 and j is an integer from 1 to 3, and n is an integer from 7 to 70.

2. The nonwoven web of claim 1 wherein, when the polymer is polypropylene (PP).

3. The nonwoven web of claim 2 wherein, $R^1$ and $R^8$ are hydrogenated abietic acid, A is —O—, $R^2$, $R^3$, $R^4$, $R^5$, $R^6$, and $R^7$ are $CH_3$, and n is an integer from 15 to 70.

4. The nonwoven web of claim 1 wherein, $R^1$ and $R^8$ are hydrogenated abietic acid, A is —O—, $R^2$, $R^3$, $R^4$, $R^5$, $R^6$, and $R^7$ are $CH_3$, and n is an integer from 15 to 70.

5. The nonwoven web of claim 1 wherein, when the polymer is polyethylene (PE).

6. The nonwoven web of claim 5 wherein $R^1$ and $R^8$ are selected from the group consisting of derivatives of dehydroabietic acid, dihydroabietic acid, abietic acid, tetrahydroabietic acid, pimaric acid and palustric acid, A is —C(O)—NH—$(CH_2)_3$—, $R^2$, $R^3$, $R^4$, $R^5$, $R^6$, and $R^7$ are $CH_3$, and n is an integer from 20 to 60.

7. The nonwoven web of claim 1 wherein $R^1$ and $R^8$ are selected from the group consisting of derivatives of dehydroabietic acid, dihydroabietic acid, abietic acid, tetrahydroabietic acid, pimaric acid and palustric acid, A is —C(O)—NH—$(CH_2)_3$—, $R^2$, $R^3$, $R^4$, $R^5$, $R^6$, and $R^7$ are $CH_3$, and n is an integer from 20 to 60.

8. The nonwoven web of claim 1 containing from about 0.05 to about 3.0% by weight of additive.

9. The nonwoven web of claim 1 containing from about 0.1 to about 0.5% by weight additive.

10. A method for making a nonwoven web which comprises mixing a polymer selected from the group consisting of polyolefins and polyesters with an additive having the structure $R^1$—A—$Si(R^2R^3)$—O—$(Si(R^4R^5)$—O$)_n$—$Si(R^6R^7)$—A—$R^8$ wherein $R^1$ and $R^8$ are selected from the group consisting of alkyl, aryl, alkylaryl groups and acyl and arylacyl derivatives of an aliphatic or aliphatic/aromatic mono-acid with a molecular weight of from about 250 to about 600 daltons, A is selected from the group consisting of —O—, —NH—C(O)—NH—$(CH_2)_3$—, and —C(O)—NH—$(CH_2)_3$—, $R^2$, $R^3$, $R^6$ and $R^7$ are selected from the group consisting of $CH_3$, $C_2H_5$, $C_3H_7$, and $C_4H_9$, $R^4$ and $R^5$ are selected from the group consisting of $CH_3$, $C_2H_5$, $C_3H_7$, and $(CH_2)_I$—$C_jF_{2j+1}$, wherein I is from 0 to 3 and j is an integer from 1 to 3, and n is an integer from 7 to 70, extruding the mixture through a spinnerette to form fibers, and forming the fibers into a nonwoven web.

11. The method of claim 10 wherein the step of mixing comprises melting the polymer and injecting the additive into the molten polymer.

12. The method of claim 11 further comprising preheating the additive to a temperature ranging from about 50° to about 100° C. prior to mixing the additive with the polymer.

13. The method of claim 12 wherein the step of mixing comprises separately dissolving the polymer and additive in one or more solvents to provide solutions thereof, mixing the solutions and removing the solvents.

14. The method of claim 12 wherein from about 0.05 to about 3% by weight of additive is mixed with the polymer.

15. The method of claim 12 wherein from about 0.1 to about 0.5% by weight of additive is mixed with the polymer.

16. The method of claim 12 wherein, when the polymer is polypropylene.

17. The method of claim 16 wherein $R^1$ and $R^8$ are hydrogenated abietic acid, A is —O—, $R^2$, $R^3$, $R^4$, $R^5$, $R^6$, and $R^7$ are $CH_3$, and n is an integer from 15 to 70.

18. The method of claim 12 wherein $R^1$ and $R^8$ are hydrogenated abietic acid, A is —O—, $R^2$, $R^3$, $R^4$, $R^5$, $R^6$, and $R^7$ are $CH_3$, and n is an integer from 15 to 70.

19. The method of claim 12 wherein, when the polymer is polyethylene (PE).

20. The method of claim 19 wherein $R^1$ and $R^8$ are selected from the group consisting of derivatives of dehydroabietic acid, dihydroabietic acid, abietic acid, tetrahydroabietic acid, pimaric acid and palustric acid, A is —C(O)—NH—$(CH_2)_3$—, $R^2$, $R^3$, $R^4$, $R^5$, $R^6$, and $R^7$ are $CH_3$, and n is an integer from 20 to 60.

21. The method of claim 12 wherein $R^1$ and $R^8$ are selected from the group consisting of derivatives of dehydroabietic acid, dihydroabietic acid, abietic acid, tetrahydroabietic acid, pimaric acid and palustric acid, A is —C(O)—NH—$(CH_2)_3$—, $R^2$, $R^3$, $R^4$, $R^5$, $R^6$, and $R^7$ are $CH_3$, and n is an integer from 20 to 60.

22. A method for making web containing synthetic fibers which comprises providing a polymer selected from the group consisting of polyolefins and polyesters including an additive having the structure $R^1$—A—$Si(R^2R^3)$—O—$(Si(R^4R^5)$—O$)_n$—$Si(R^6R^7)$—A—$R^8$ wherein $R^1$ and $R^8$ are selected from the group consisting of alkyl, aryl, alkylaryl groups and acyl and arylacyl derivatives of an aliphatic or aliphatic/aromatic mono-acid with a molecular weight of from about 250 to about 600 daltons, A is selected from the group consisting of —O—, —NH—C(O)—NH—$(CH_2)_3$—, and —C(O)—NH—$(CH_2)_3$—, $R^2$, $R^3$, $R^6$ and $R^7$ are selected from the group consisting of $CH_3$, $C_2H_5$, $C_3H_7$, and $C_4H_9$, $R^4$ and $R^5$ are selected from the group consisting of $CH_3$, $C_2H_5$, $C_3H_7$, and $(CH_2)_I$—$C_jF_{2j+1}$, wherein I is from 0 to 3 and j is an integer from 1 to 3, and n is an integer from 7 to 70, extruding the polymer to make fibers thereof and producing a web including the fibers.

23. The method of claim 22 wherein the step of producing a web includes processes selected from the group consisting of weaving, spunbonding and melt-blowing the fibers.

24. The method of claim 22 wherein the step of providing the polymer comprises melt blending the polymer with the additive.

25. The method of claim 24 further comprising preheating the additive to a temperature ranging from about 50° to about 100° C. prior to blending the additive with the polymer.

26. The method of claim 22 wherein the step of providing the polymer comprises dissolving the polymer and additive in one or more solvents and removing the solvents.

27. The method of claim 26 wherein from about 0.05 to about 3% by weight of additive is mixed with the polymer.

28. The method of claim 26 wherein from about 0.1 to about 0.5% by weight of additive is mixed with the polymer.

29. The method of claim 26 wherein, when the polymer is polypropylene.

30. The method of claim 29 wherein $R^1$ and $R^8$ are hydrogenated abietic acid, A is —O—, $R^2$, $R^3$, $R^4$, $R^5$, $R^6$, and $R^7$ are $CH_3$, and n is an integer from 15 to 70.

31. The method of claim 26 wherein $R^1$ and $R^8$ are hydrogenated abietic acid, A is —O—, $R^2$, $R^3$, $R^4$, $R^5$, $R^6$, and $R^7$ are $CH_3$, and n is an integer from 15 to 70.

32. The method of claim 26 wherein, when the polymer is polyethylene.

33. The method of claim 32 wherein $R^1$ and $R^8$ are selected from the group consisting of derivatives of dehydroabietic acid, dihydroabietic acid, abietic acid, tetrahydroabietic acid, pimaric acid and palustric acid, A is —C(O)—NH—$(CH_2)_3$—, $R^2$, $R^3$, $R^4$, $R^5$, $R^6$, and $R^7$ are $CH_3$, and n is an integer from 20 to 60.

34. The method of claim 26 wherein $R^1$ and $R^8$ are selected from the group consisting of derivatives of dehydroabietic acid, dihydroabietic acid, abietic acid, tetrahydroabietic acid, pimaric acid and palustric acid, A is —C(O)—NH—$(CH_2)_3$—, $R^2$, $R^3$, $R^4$, $R^5$, $R^6$, and $R^7$ are $CH_3$, and n is an integer from 20 to 60.

35. The nonwoven fabric of claim 1 wherein said fibers comprise substantially continuous filaments bonded to one another and forming a spunbond nonwoven web.

36. The nonwoven fabric of claim 1 wherein said fibers comprise microfibers randomly deposited and forming a meltblown nonwoven web.

* * * * *

UNITED STATES PATENT AND TRADEMARK OFFICE
CERTIFICATE OF CORRECTION

PATENT NO. : 6,150,020
DATED : November 21, 2000
INVENTOR(S) : Dharmadhikary et al.

It is certified that error appears in the above-identified patent and that said Letters Patent is hereby corrected as shown below:

Title page,
Item [57]ABSTRACT, line 16, "from I to 3" should read -- from 1 to 3 --.

Column 10,
Line 4, 8, 10, 12, 17, 20 and 28, "claim 12" each occurrence, should read claim 10 --; lines 64 and 66, "claim 26", both occurrences, should read -- claim 22 --.

Column 11,
Lines 1, 6 and 9, "claim 26" each occurrence, should read -- claim 22 --.

Column 12,
Line 1, "claim 26" should read -- claim 22 --.

Signed and Sealed this

Twenty-third Day of October, 2001

Attest:

*Nicholas P. Godici*

NICHOLAS P. GODICI
*Acting Director of the United States Patent and Trademark Office*

*Attesting Officer*